United States Patent [19]

Sakaguchi et al.

[11] Patent Number: 5,656,213
[45] Date of Patent: Aug. 12, 1997

[54] PROCESS FOR THE PRODUCTION OF CARBON-FILLED CERAMIC COMPOSITE MATERIAL

[75] Inventors: Mikio Sakaguchi; Kazuhiro Otsuka, both of Wakayama, Japan

[73] Assignee: Kao Corporation, Tokyo, Japan

[21] Appl. No.: 457,599

[22] Filed: Jun. 1, 1995

Related U.S. Application Data

[62] Division of Ser. No. 430,165, Apr. 27, 1995, abandoned, which is a continuation of Ser. No. 203,732, Feb. 28, 1994, abandoned, which is a continuation of Ser. No. 905,403, Jun. 29, 1992, abandoned.

[30] Foreign Application Priority Data

Jun. 27, 1991 [JP] Japan .................................. 3-183415
Jun. 27, 1991 [JP] Japan .................................. 3-183416

[51] Int. Cl.$^6$ ................................................ C01B 31/00
[52] U.S. Cl. .................... 264/29.7; 264/12; 264/29.1; 264/661; 501/90; 501/99; 423/345; 423/346
[58] Field of Search ................... 264/12, 29.1, 29.7, 264/60; 423/345, 346; 419/1, 5; 501/90, 99

[56] References Cited

U.S. PATENT DOCUMENTS

| | | | |
|---|---|---|---|
| 4,124,667 | 11/1978 | Coppola et al. | 501/90 |
| 4,230,497 | 10/1980 | Schwetz et al. | 501/90 |
| 4,690,909 | 9/1987 | Okuno et al. . | |
| 4,853,299 | 8/1989 | Mizutani et al. | 264/60 |
| 4,980,104 | 12/1990 | Kawasaki | 501/90 |
| 4,987,103 | 1/1991 | Kinugasa et al. . | |
| 5,075,264 | 12/1991 | Kinugasa et al. . | |

FOREIGN PATENT DOCUMENTS

| | | |
|---|---|---|
| 63-260861 | 10/1988 | Japan . |
| 63-265850 | 11/1988 | Japan . |
| 1320254 | 12/1989 | Japan . |
| 333064 | 2/1991 | Japan . |

*Primary Examiner*—Donald E. Czaja
*Assistant Examiner*—Michael Philip Colaianni
*Attorney, Agent, or Firm*—Sughrue, Mion, Zinn, Macpeak & Seas

[57] ABSTRACT

A process for producing a carbon-filled ceramic composite material comprising a ceramic matrix and a carbon domain dispersed therein with a carbon domain diameter of from 0.01 to 30 μm and a carbon domain area ratio of from 5 to 70%; comprising the steps of mixing ceramic powder, sintering aids and a carbon source, calcining the mixture at 300°–600° C., granulating the mixture, molding and sintering.

3 Claims, 1 Drawing Sheet

PROCESS FOR THE PRODUCTION OF CARBON-FILLED CERAMIC COMPOSITE MATERIAL

This is a divisional of application Ser. No. 08/430,165 filed Apr. 27, 1995 abandoned, which is a continuation of prior application Ser. No. 08/203,732 filed Feb. 28, 1994 (abandoned), which is a continuation of prior application Ser. No. 07/905,403 filed Jun. 29, 1992 (abandoned).

FIELD OF THE INVENTION

This invention relates to a carbon-filled ceramic composite material suitable for use as sliding structural parts, etc., a process for producing the same, sliding parts using the same, and apparatus comprising the same.

BACKGROUND OF THE INVENTION

In recent years, ceramics have been aggressively studied for use as structural parts because of their superiority over metals with respect to heat resistance, strength, hardness, and corrosion resistance. Inter alia, silicon carbide ceramics, which are excellent in strength, hardness, and corrosion resistance, have already been put to practical use in some fields such as mechanical seals or sliding parts (such as bearings). However, the range of applicable uses in sliding parts has been limited due to poor sliding characteristics in dry atmosphere and low thermal shock resistance.

Incorporation of a lubricating filler, e.g., carbon and graphite, into silicon carbide is one approach to improving the sliding characteristics of ceramics. For example, incorporation of granular graphite into ceramic materials is proposed in JP-A-63-260861 (the term "JP-A", as used herein, means an "unexamined published Japanese patent application") under the title "Self-Lubricating SiC-Graphite Ceramics", and JP-A-63-265850, under the title "Self-Lubricating Ceramic Composite Materials and Process For Producing The Same"; and incorporation of self-sintering carbonaceous fine spherical particles is proposed in JP-A-3-33064 under the title "Powder Composition For Producing Carbon-Silicon Carbide Composite Material, A Process For Producing Carbon-Silicon Carbide Composite Material, and Carbon-Silicon Carbide Composite Material".

According to these techniques, however, incorporation of carbon or graphite particles, though successful in reducing the sliding coefficient of friction, reduces the density and strength, resulting in impairment of characteristics essential to ceramics. Thus, the resulting composite materials have poor durability.

JP-A-1-320254, entitled "Carbon-Filled Ceramic Composite Material and Process For Producing The Same", discloses a method for optimizing the degree of graphitization of carbon present in a composite material by means of X-ray diffractometry. Although the resulting composite material has excellent sliding characteristics and strength, the optimum condition of the carbon present in the composite material and the optimum source of carbon are not specified, and the composite material has poor thermal shock resistance. Moreover, the process for production involves a complicated step of calcination under pressure and is, therefore, unsuitable for industrial production.

SUMMARY OF THE INVENTION

An object of the present invention is to provide a carbon-filled ceramic composite material with excellent strength, sliding characteristics, and thermal shock resistance.

Another object of the present invention is to provide a process for producing the above-described carbon-filled ceramic composite material.

A further object of the present invention is to provide a sliding part using the above-described carbon-filled ceramic composite material.

The inventors have conducted extensive investigations and, as a result, found that the above objects of the present invention are accomplished by specifying a domain diameter and a domain area ratio of carbon and, thus, reached the present invention.

The present invention thus provides a carbon-filled ceramic composite material comprising a ceramic matrix and a carbon domain dispersed therein with a carbon domain diameter of from 0.01 to 30 µm and a carbon domain area ratio of from 5 to 70%. The carbon-filled ceramic composite material preferably has a void ratio of not more than 20%.

The present invention also provides a process for producing the above-mentioned carbon-filled ceramic composite material comprising mixing a ceramic powder with a condensed polycyclic aromatic compound and/or polycondensed aromatic compound having a hydrogen to carbon (H/C) ratio of from 0.2 to 2.0, a nitrogen content $\leq 2\%$ in the compound, a sulfur content $\leq 2\%$ in the compound, and an average molecular weight of from 100 to 2000, calcining the mixture, granulating the calcined mixture, shaping the granules, and sintering the shaped article. If desired, a sintering aid powder may be added to the mixture before calcination.

The present invention further provides a sliding part in sliding contact with a mechanical element having a movable or fixative part, at least the sliding surface of the sliding part comprising the above-mentioned carbon-filled ceramic composite material.

DETAILED DESCRIPTION OF THE INVENTION

Figure 1:
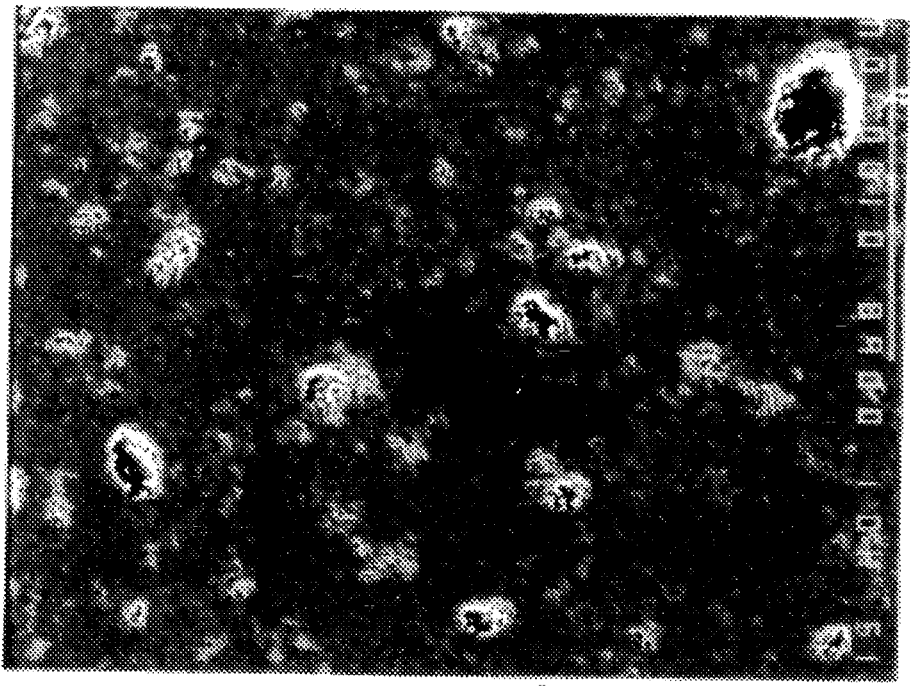
FIG. 1 is a scanning electron micrograph of the carbon-filled ceramic composite material obtained in Example 10, revealing the dispersed state and shape of carbon.

The terminology "carbon domain diameter", as used herein, means the size of carbon particles, or agglomerates thereof, dispersed in a ceramic matrix. A carbon domain diameter is obtained as an average of 100 scanning electron micrographs on a mirror-polished sample with the aid of an image analyzer. The carbon domain diameter of the carbon-filled ceramic composite material, according to the present invention, ranges from 0.01 to 30 µm, preferably, from 0.05 to 20 µm, and, more preferably, from 0.1 to 15 µm. If it is less than 0.01 µm, sliding characteristics are not exhibited. If it exceeds 30 µm, strength is reduced. The standard deviation of the sizes of carbon particles or agglomerates thereof preferably has the value satisfying the expression $\sigma/\bar{x} \leq 0.85$ wherein $\sigma$ represents the standard deviation and $\bar{x}$ represents the average carbon domain diameter.

The terminology "carbon domain area ratio", as used herein, means the average area ratio of carbon domains in a ceramic matrix obtained through image analysis (similarly to carbon domain diameter). The carbon domain area ratio of the carbon-filled ceramic composite material according to the present invention ranges from 5 to 70% (corresponding to a carbon content of from 3.5 to 49% by weight), preferably, from 7 to 60% (corresponding to a carbon content of from 5 to 44% by weight), and, more preferably, from 15 to 50% (corresponding to a carbon content of from 11 to 36% by weight). If the carbon domain area ratio is less than 5%, desired sliding characteristics are not obtained. If the carbon domain area ratio exceeds 70%, strength is reduced.

The terminology "void ratio", as used herein, means an average volume ratio of the part except a ceramic matrix and carbon domains, obtained through image analysis (similarly to carbon domain diameter). The void ratio of the carbon-filled ceramic composite material according to the present invention is $\leq 20\%$ and, preferably, $\leq 10\%$ ($\leq 18\%$ and, preferably, $\leq 9\%$ as an apparent porosity determined by the Archimedes method). If it exceeds 20%, strength is reduced.

Ceramic powders which can be used in the present invention include oxides, e.g., $Al_2O_3$, $ZrO_2$, $TiO_2$, MgO, SrO, NiO, MnO, and $Y_2O_3$; carbides, e.g., SiC, TiC, WC, $B_4C$, and ZrC; nitrides, e.g., $Si_3N_4$, AlN, BN, TiN, and ZrN; borides, e.g., $ZrB_2$, CrB, and $TiB_2$; and mixtures of two or more thereof, e.g., $Al_2O_3$-$TiO_2$, $Al_2O_3$-SiC, and $ZrO_2$-$Y_2O_3$. The mixture of the ceramic powders may be a solid solution.

The ceramic powder preferably has a purity $\leq 90\%$ by weight, and, more preferably, $\leq 95\%$ by weight, for prevention of reductions in density, strength, and fracture toughness, and for ensuring mechanical characteristics such as Young's modulus. If the purity is <90% by weight, it is likely that characteristics essential to ceramics, such as heat resistance and high hardness, cannot be obtained.

The ceramic powder preferably has an average particle size of from 0.05 to 5.00 µm, and, more preferably, from 0.1 to 3.0 µm, from the viewpoint of sintering properties. If the average particle size is less than 0.05 µm, the powder tends to be agglomerated, failing to form a uniform composite structure. If it exceeds 5.00 µm, the sintering properties tend to be deteriorated, making it difficult to obtain a sintered body of high density.

Of the above-enumerated ceramic powders, it is particularly recommended to use silicon carbide in the present invention. Silicon carbide forming a ceramic matrix may have either an α-crystal form or a β-crystal form. A mixture of the α-crystal form silicon carbide and the β-crystal form silicon carbide may also be used. To prevent a reduction in density, strength or fracture toughness, and to ensure mechanical characteristics such as Young's modulus, the silicon carbide preferably has a purity $\geq 90\%$ by weight, and, more preferably, $\geq 95\%$ by weight. If the purity is <90% by weight, it is likely that characteristics essential to ceramics, such as heat resistance and high hardness, cannot be obtained. From the viewpoint of sintering properties, the silicon carbide preferably has an average particle size of from 0.05 to 5.00 µm, and, more preferably, from 0.1 to 3.0 µm. If the average particle size is less than 0.05 µm, the powder tends to be agglomerated, failing to form a uniform composite structure. If it exceeds 5.00 µm, the sintering properties tend to be deteriorated; e.g. there is no increase in density and a sintered body having low strength is achieved.

If desired, for the purpose of improving fracture toughness and oxidation resistance, silicon carbide may be used in combination with other ceramic powders selected from those enumerated above. The other ceramic powders are preferably used in a total amount of from 5 to 50%, by weight, based on silicon carbide.

Carbon sources in the composite material are compounds capable of being converted to carbon on heating. Such compounds preferably include condensed polycyclic aromatic compounds and/or polycondensed aromatic compounds having an H/C ratio of from 0.2 to 2.0, a nitrogen content $\leq 2\%$, a sulfur content $\leq 2\%$, and an average molecular weight of from 100 to 2000. Specific examples of suitable compounds are coal tar, pitch, phenol resin, furan resin, and derivatives thereof. While not limiting, the compounds which can be easily graphitized are preferred. If the H/C ratio or average molecular weight are outside of their respective ranges, dispersibility of carbon is deteriorated, resulting in a reduction in strength. If the nitrogen or sulfur content exceeds 2%, the composite material tends to suffer from fine cracks during sintering only to produce a sintered body of low strength. The terminology "carbon", as used herein, means a species having a peak of graphite in its X-ray diffraction pattern. While the degree of graphitization is not particularly limited, the greater, the better. More specifically, a (002) spacing, as determined by X-ray diffractometry, is preferably in a range of from 3.3 to 3.5 Å.

The carbon-filled ceramic composite material comprising a ceramic matrix and a carbon domain dispersed therein of the present invention can be produced by mixing the above-mentioned ceramic powder with a carbon source, calcining the mixture, followed by granulating, shaping the granules, and sintering the shaped article. If desired, a sintering aid powder may also be added to the ceramic powder and carbon source.

Sintering aid powders which can be used are not particularly limited, and any of commonly employed sintering aids may be employed. Examples of suitable sintering aids include boron compounds, alumina, yttria, etc. and mixtures thereof. Use of the sintering aid is not essential but is recommended in the case of using the powder which is not easily sintered; e.g., silicon carbide, as a ceramic powder. The sintering aid is used in an amount usually of from 0.1 to 20% by weight and, preferably, of from 0.2 to 10% by weight.

Mixing of raw materials is usually conducted in a wet process by means of a ball mill, a vibration mill, a planetary mill, etc. Solvents to be used for wet mixing preferably include organic solvents, such as aromatic hydrocarbons, e.g., benzene, toluene, and xylene; alcohols, e.g., methanol and ethanol; and ketones, e.g., methyl ethyl ketone.

Calcination is usually carried out by heating the mixture in an inert atmosphere (e.g., nitrogen gas or argon gas) at a temperature of from 300° to 600° C. When calcined at temperatures below 300° C., the carbon source cannot be sufficiently converted to carbon, leaving a considerable residual volatile content, and the mixture fails to increase in density. If the calcination temperature is higher than 600° C., the particles undergo free sintering, making re-dispersion by spray drying difficult.

Granulation of the calcined mixture is carried out in a known manner, for example, spray drying.

Shaping of granules can be conducted by, for example, molding, CIP method, and slip casting.

Sintering is preferably carried out under atmospheric pressure in a non-oxidative atmosphere such as an inert atmosphere (e.g., nitrogen gas, argon gas) or in vacuo at a temperature of from 1200° to 2300° C. and, preferably, from 1600° to 2200° C. If the sintering temperature is outside of this range, the resulting sintered body tends to have a reduced density or suffers from deterioration of mechanical characteristics, such as strength and hardness, due to growth of ceramic particles. The sintering time is usually from 0.5 to 8 hours. For obtaining a high density, sintering may be effected by a hot press method, an HIP method, etc.

The thus produced composite material having the above-recited specific carbon domain diameter, carbon domain area ratio, and void ratio is excellent in strength, sliding characteristics, and thermal shock resistance and is, therefore, extremely suitable for use as a sliding part. More specifically, the carbon-filled ceramic composite material of the present invention has a flexural strength $\geq 250$ MPa at room temperature, a thermal shock resistance $\geq 250°$ C., a friction coefficient $\leq 0.5$, and a specific wear $\leq 15$ mm$^2$/kg.

The silicon carbide-carbon composite material of the present invention, which is obtained by using silicon carbide as a main ceramic powder, is especially excellent in strength, sliding characteristics, and thermal shock resistance. More specifically, it has a flexural strength $\geq 300$ MPa at room temperature, a thermal shock resistance $\geq 350°$ C., friction coefficient $\leq 0.4$, and a specific wear $\leq 10$ mm$^2$/kg.

The sliding part according to the present invention is a part in sliding contact with a mechanical element having a movable or fixative part, at least the sliding surface of the sliding part comprising the above-mentioned carbon-filled ceramic composite material. The apparatus according to the present invention comprises sliding members which are in sliding contact with each other, at least a sliding surface of the sliding member comprising the above-mentioned carbon-filled ceramic composite material. Examples of sliding parts include a bearing, a bearing retainer, a bearing ball, a mechanical slider, a magnetic-head slider, Apex seal, a sliding guide, a shaft, a gear, a blade, parts for an automobile (a cam, a follower, a valve, a valve guide, a valve seat, etc.), a mechanical seal, a flow control valve for a coal slurry, a disc valve for a faucet, and a draw die.

The present invention is now illustrated in greater detail by way of Examples, but it should be understood that the present invention is not deemed to be limited thereto. Unless otherwise indicated, all parts, percents, ratios and the like used hereinbefore and hereinafter are by weight.

Carbon sources used in Examples 1, 5 to 8, 10, 14, 16, 17, 19, and 23 were prepared as follows. Coal tar pitch having a softening point of 81° C., an ash content of 0.1% and a TI content of 13.5% was added to benzene, toluene, or quinoline in a concentration of 30% by weight, following by stirring at 40° to 80° C. Each solution was filtered through a filter having a mesh size of 0.2 μm to obtain a benzene-soluble fraction having a molecular weight (Mw) of not more than 700 and an H/C ratio of from 0.6 to 1.8, a toluene-soluble fraction having a Mw of not more than 600 and an H/C ratio of from 0.5 to 1.8, or a quinoline-soluble fraction having a Mw of not more than 2000 and an H/C ratio of from 0.2 to 0.8. The benzene-soluble fraction is used for Examples 6 and 8. The toluene-soluble fraction is used for Examples 5, 7, 16, 19, and 23. The quinoline-soluble fraction is used for Examples 1, 10, and 17.

In Examples 4, 11 to 13, 15, and 20 to 22, a novolak type phenol resin having a Mw of from 500 to 800 and an H/C ratio of from 0.7 to 1.4 or a resol type phenol resin having a Mw of from 150 to 450 and an H/C ratio of from 0.4 to 1.3 was used as the carbon source.

Carbon sources used in Examples 2, 3, 9, and 18 were prepared by mixing the above-described novolak type or resol type phenol resin and the above-described toluene-soluble fraction of coal tar pitch so as to have a predetermined Mw and H/C ratio.

Carbon sources used in Comparative Examples 1 to 4 and 6 were prepared by subjecting the above-described quinoline-insoluble fraction of coal tar pitch to heat treatment in a non-oxidative atmosphere so as to have a predetermined Mw and H/C ratio.

In Comparative Example 5, a phenol monomer was used as a carbon source.

EXAMPLES 1 TO 13

A carbon source, a ceramic powder having an average particle size of from 0.1 to 3 μm, and, in some cases, a sintering aid, each shown in Table 1 below, were wet blended with toluene in a vibration mill, and the mixture was calcined in a nitrogen atmosphere at a temperature shown in Table 1. The calcined mixture was granulated by spray drying, shaped in a mold, and sintered under conditions shown in Table 1.

The resulting composite material was mirror polished and observed under a scanning electron microscope to take 100 micrographs. The micrographs were analyzed on an image analyzer "LUZEX-III" manufactured by Nireco Co. to obtain an average carbon domain diameter, an average carbon domain area ratio, and an average void ratio. The results obtained are shown in Table 2 below.

Figure 2:
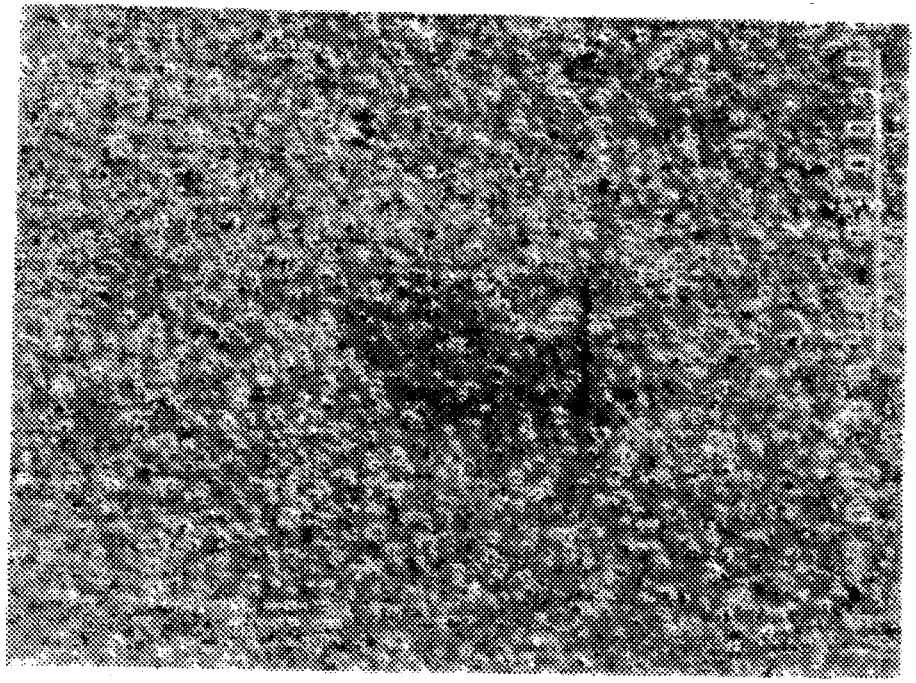
FIG. 2 is a scanning electron micrograph of the carbon-filled ceramic composite material obtained in Comparative Example 2, revealing the dispersed state and shape of carbon.

The scanning electron micrograph of the sample obtained in Example 10 is shown in FIG. 1. It is apparent that the composite material according to the present invention has a uniform structure having a smaller carbon domain diameter and no giant void as compared with that obtained in Comparative Example 2 hereinafter described (FIG. 2).

Further, each of the resulting composite materials were evaluated according to the following test methods. The results of evaluation are also shown in Table 2.

1) Flexural Strength:

Measured by a three-point bending test according to JIS-R1601.

2) Thermal Shock Resistance:

A sample prepared according to JIS-R1601 was heated in an inert atmosphere to a prescribed temperature and immediately thereafter quenched by pouring into water at room temperature. The thus treated sample was tested by a three-point bending test. Thermal shock resistance was evaluated from a temperature difference in the thermal history which caused a drastic reduction of strength.

3) Friction Coefficient and Specific Wear:

A disc sample having a diameter of 50 mm and a thickness of 10 mm was prepared. With the sample being fixed, a tungsten carbide pin having a diameter of 10 mm and a length of 15 mm was slid thereon under a load of 10 kg and at a sliding speed of 1 m/sec. A friction coefficient was calculated from the torque during sliding, and a specific wear was calculated from the weight change of the sample at the time when the sliding distance reached $10^4$ m.

It can be seen from Table 2 that the composite materials according to the present invention, obtained by sintering at atmospheric pressure, is a high density sintered body with a small void which has a high strength, a high thermal shock resistance, a small friction coefficient, and a small specific wear, proving excellent in sliding characteristics.

TABLE 1

| Example No. | Ceramic Powder | Carbon Source | | | | Ceramic Powder/ Carbon Source For Carbon Mixing Ratio (%) | Sintering Aid (%) | Calcination Temperature (°C.) | Sintering Condition (Atmosphere) (°C. × hrs) |
| --- | --- | --- | --- | --- | --- | --- | --- | --- | --- |
| | | H/C | Mw | S (%) | N (%) | | | | |
| 1 | Al$_2$O$_3$ | 0.8 | 1200 | 0.8 | 0.9 | 93/7 | MgO 0.1 (argon) | 400 | 1400 × 2 |
| 2 | Al$_2$O$_3$ | 1.5 | 1300 | 1.3 | 0.9 | 85/15 | MgO 0.1 | 500 | " |
| 3 | ZrO$_2$ | 0.9 | 1000 | 1.2 | 0.8 | 93/7 | — | 400 | " |
| 4 | ZrO$_2$ | 1.2 | 500 | 1.3 | 0.8 | 90/10 | — | 500 | " |
| 5 | MgO | 0.6 | 550 | 1.3 | 0.9 | 93/7 | — | 400 | " |
| 6 | ZrB$_2$ | 0.7 | 450 | 1.2 | 1.0 | 90/10 | — | 400 | 2000 × 2 (vacuum) |
| 7 | B$_4$C | 0.6 | 550 | 1.7 | 0.7 | 90/10 | — | 550 | 2000 × 2 (vacuum) |
| 8 | TiC | 0.6 | 555 | 1.9 | 0.8 | 70/30 | — | 500 | 2000 × 2 (vacuum) |
| 9 | TiC | 1.5 | 1300 | 1.0 | 1.4 | 50/50 | — | 600 | 2000 × 2 (vacuum) |
| 10 | SiC | 0.6 | 1500 | 0.5 | 0.3 | 80/20 | B$_4$C 1 | 400 | 2000 × 2 (vacuum) |
| 11 | SiC/TiC | 0.8 | 200 | 1.3 | 0.9 | 45 + 35/20 | B$_4$C 1 | 450 | 2100 × 2 (argon) |
| 12 | Al$_2$O$_3$/SiC | 0.8 | 200 | 0.8 | 0.8 | 50 + 30/20 | — | 450 | 1800 × 2 (argon) |
| 13 | TiN | 0.8 | 200 | 1.2 | 1.0 | 90/10 | — | 450 | 1900 × 2 (nitrogen) |

TABLE 2

| Example No. | Flexural Strength (MPa) | Thermal Shock Resistance (°C.) | Friction Coefficient | Specific Wear (mm$^2$/kg) | Carbon Domain Diameter (μm) | Carbon Domain Area Ratio (%) | Void Ratio (%) |
| --- | --- | --- | --- | --- | --- | --- | --- |
| 1 | 320 | 280 | 0.30 | 3.5 | 1.5 | 13 | 2.5 |
| 2 | 350 | 270 | 0.28 | 2.3 | 2.2 | 26 | 5.9 |
| 3 | 390 | 260 | 0.25 | 4.2 | 1.3 | 18 | 4.3 |
| 4 | 320 | 260 | 0.22 | 3.8 | 3.5 | 25 | 10.5 |
| 5 | 300 | 260 | 0.32 | 12.5 | 1.3 | 12 | 10.3 |
| 6 | 350 | 380 | 0.28 | 3.5 | 4.3 | 12 | 2.1 |
| 7 | 380 | 400 | 0.31 | 2.5 | 5.5 | 13 | 2.5 |
| 8 | 500 | 350 | 0.25 | 1.3 | 11.5 | 41 | 3.1 |
| 9 | 480 | 350 | 0.23 | 1.2 | 12.3 | 61 | 4.5 |
| 10 | 630 | 690 | 0.28 | 2.3 | 2.1 | 14.5 | 2.5 |
| 11 | 530 | 600 | 0.28 | 2.8 | 3.5 | 18.0 | 2.7 |
| 12 | 475 | 300 | 0.31 | 2.1 | 2.4 | 23.5 | 6.3 |
| 13 | 420 | 350 | 0.35 | 8.5 | 4.8 | 12.0 | 4.8 |

EXAMPLES 14 TO 23

A carbon source (shown in Table 3 below), β-silicon carbide powder having an average particle size of 0.5 μm and a purity of 98%, and 2% of B$_4$C (as a sintering aid) were wet blended with ethanol in a vibration mill, and the mixture was calcined in an argon atmosphere at a temperature shown in Table 3. The mixture was granulated by spray drying, shaped in a mold, and sintered in argon at 2100° C. for 1 hour.

The average carbon domain diameter, the average carbon domain area ratio, and the average void ratio of each of the resulting composite materials were evaluated in the same manner as in Example 1. The results obtained are shown in Table 4 below.

Further, the flexural strength, thermal shock resistance, friction coefficient and specific wear of each composite material was evaluated in the same manner as in Example 1. The results obtained are also shown in Table 4.

It can be seen from Table 4 that the composite materials according to the present invention, obtained by sintering at atmospheric pressure, is a high density sintered body with a small void ratio which has a high strength, a high thermal shock resistance, a small friction coefficient, and a small specific wear, proving excellent in sliding characteristics.

TABLE 3

| Example No. | Ceramic Powder | Carbon Source H/C | Carbon Source Mw | Carbon Source S (%) | Carbon Source N (%) | Ceramic Powder/ Carbon Source For Carbon Mixing Ratio (%) | Sintering Aid (%) | Calcination Temperature (°C.) | Sintering Condition (Atmosphere) (°C. × hrs) |
|---|---|---|---|---|---|---|---|---|---|
| 14 | SiC | 0.8 | 1200 | 0.9 | 0.3 | 95/5 | B$_4$C  2 | 400 | 2100 × 1 (argon) |
| 15 | " | 1.2 | 500 | 0.8 | 1.2 | 95/5 | " | 400 | 2100 × 1 (argon) |
| 16 | " | 0.5 | 550 | 0.8 | 0.1 | 90/10 | " | 500 | 2100 × 1 (argon) |
| 17 | " | 0.2 | 1800 | 0.2 | 0.4 | 90/10 | " | 400 | 2100 × 1 (argon) |
| 18 | " | 0.6 | 800 | 0.5 | 0.3 | 75/25 | " | 400 | 2100 × 1 (argon) |
| 19 | " | 0.5 | 550 | 0.2 | 1.2 | 75/25 | " | 500 | 2100 × 1 (argon) |
| 20 | " | 0.7 | 150 | 0.3 | 1.4 | 70/30 | " | 400 | 2100 × 1 (argon) |
| 21 | " | 1.3 | 150 | 0.4 | 0.5 | 60/40 | " | 400 | 2100 × 1 (argon) |
| 22 | " | 1.4 | 350 | 0.4 | 0.4 | 60/40 | " | 500 | 2100 × 1 (argon) |
| 23 | " | 0.6 | 550 | 0.1 | 0.3 | 50/50 | " | 400 | 2100 × 1 (argon) |

TABLE 4

| Example No. | Flexural Strength (MPa) | Thermal Shock Resistance (°C.) | Friction Coefficient | Specific Wear (mm$^2$/kg) | Carbon Domain Diameter (μm) | Carbon Domain Area Ratio (%) | Void Ratio (%) |
|---|---|---|---|---|---|---|---|
| 14 | 540 | 450 | 0.32 | 2.5 | 0.05 | 9.0 | 2.0 |
| 15 | 560 | 450 | 0.30 | 2.6 | 0.5 | 9.0 | 1.5 |
| 16 | 580 | 580 | 0.20 | 1.1 | 2.5 | 13.5 | 2.9 |
| 17 | 565 | 650 | 0.24 | 1.8 | 15.0 | 13.5 | 2.1 |
| 18 | 580 | 600 | 0.28 | 2.3 | 2.1 | 28.5 | 2.5 |
| 19 | 610 | 690 | 0.17 | 0.5 | 1.5 | 28.5 | 0.3 |
| 20 | 580 | 630 | 0.24 | 2.3 | 1.5 | 39.0 | 2.3 |
| 21 | 490 | 620 | 0.19 | 1.2 | 2.3 | 39.0 | 1.3 |
| 22 | 470 | 650 | 0.23 | 6.7 | 10.1 | 49.5 | 8.7 |
| 23 | 320 | 660 | 0.26 | 10.0 | 1.4 | 50.0 | 4.5 |

COMPARATIVE EXAMPLES 1 TO 3

A carbon source, a ceramic powder having an average particle size of from 0.1 to 3 μm, and, in some cases, a sintering aid each shown in Table 5 below were wet blended with toluene in a vibration mill, and the mixture was calcined in a nitrogen atmosphere at a temperature shown in Table 5. The mixture was granulated by spray drying, shaped in a mold, and sintered under conditions shown in Table 5.

The average carbon domain diameter, the average carbon domain area ratio, and the average void ratio of each of the resulting composite materials were determined in the same manner as in Example 1. The results obtained are shown in Table 6 below. The scanning electron micrograph of the composite material obtained in Comparative Example 2 is shown in FIG. 2.

Further, the flexural strength, thermal shock resistance, friction coefficient and specific wear of each composite material were evaluated in the same manner as in Example 1. The results obtained are also shown in Table 6.

It can be seen from Table 6 that these comparative composite materials have a large void, a low strength, a poor thermal shock resistance, a high friction coefficient, and a high specific wear, proving inferior in sliding characteristics as compared to the Examples of the present invention.

COMPARATIVE EXAMPLES 4 TO 6

A carbon source (shown in Table 5 below), β-silicon carbide powder having an average particle size of 0.5 μm and a purity of 98%, and 2% of B$_4$C (as a sintering aid) were wet blended with ethanol in a vibration mill, and the mixture was calcined in an argon atmosphere at a temperature shown in Table 5. The mixture was granulated by spray drying, shaped in a mold, and sintered in argon at 2100° C. for 1 hour.

The average carbon domain diameter, the average carbon domain area ratio, and the average void ratio of each of the resulting composite materials were observed in the same manner as in Example 1. The results obtained are shown in Table 6 below.

Further, the flexural strength, thermal shock resistance, friction coefficient and specific wear of each composite material was evaluated in the same manner as in Example 1. The results obtained are also shown in Table 6.

It can be seen from Table 6 that these comparative composite materials have a large void, a large carbon domain diameter, a low strength, a poor thermal shock resistance, a high friction coefficient, and a high specific wear, proving inferior in sliding characteristics.

of a practical test, the twisting ring had higher abrasion resistance and higher durability as compared with a conventional ceramic ring.

TABLE 5

| Compara. Example No. | Ceramic Powder | Carbon Source | | | | Ceramic Powder/ Carbon Source For Carbon Mixing Ratio (%) | Sintering Aid (%) | Calcination Temperature (°C.) | Sintering Condition (Atmosphere) (°C. × hrs) |
|---|---|---|---|---|---|---|---|---|---|
| | | H/C | Mw | S (%) | N (%) | | | | |
| 1 | ZrO₂ | 0.1 | 1600 | 3.3 | 1.3 | 80/20 | — | 500 | 1400 × 2 (argon) |
| 2 | SiC | 0.05 | 5000 | 0.8 | 2.3 | 80/20 | B₄C 1 | 400 | 2000 × 2 (vacuum) |
| 3 | Al₂O₃ | 0.05 | 1500 | 0.5 | 0.7 | 80/20 | — | 300 | 1400 × 2 (argon) |
| 4 | SiC | 0.02 | 5000 | 0.8 | 2.3 | 80/20 | B₄C 2 | 400 | 2100 × 1 |
| 5 | " | 1.0 | 90 | 0.1 | 0.1 | 30/70 | " | 500 | " |
| 6 | " | 0.05 | 1500 | 0.8 | 3.3 | 70/30 | " | 400 | " |

TABLE 6

| Comparative Example No. | Flexural Strength (MPa) | Thermal Shock Resistance (°C.) | Friction Coefficient | Specific Wear (mm²/kg) | Carbon Domain Diameter (μm) | Carbon Domain Area Ratio (%) | Void Ratio (%) |
|---|---|---|---|---|---|---|---|
| 1 | 150 | 110 | 0.65 | 49 | 28 | 35 | 21.5 |
| 2 | 130 | 320 | 0.64 | 39 | 35 | 13.5 | 20.0 |
| 3 | 80 | 100 | 0.65 | 69 | 55 | 33 | 43.3 |
| 4 | 130 | 320 | 0.64 | 39 | 35 | 13.5 | 20.0 |
| 5 | 93 | 470 | 0.51 | 94 | N.D. | N.D. | 37.3 |
| 6 | 85 | 340 | 0.48 | 75 | 60 | 39.0 | 35.0 |

Note: N.D. means undetectable.

EXAMPLES 24 AND 25

Each of the composite materials obtained in Examples 1 and 14 were manufactured into a bearing. The resulting bearing exhibited long-term durability in a practical test using no lubricant.

EXAMPLES 26 AND 27

Each of the composite materials obtained in Examples 2 and 15 were used as a mechanical seal. The composite material exhibited satisfactory sealing performance and long-term durability as compared with a conventional one.

EXAMPLES 28 AND 29

Each of the composite materials obtained in Examples 3 and 16 were manufactured into a flow control valve for a coal slurry. As a result of a practical test, the valve exhibited satisfactory sliding characteristics and abrasion resistance, and cut-off of a coal slurry could be conducted smoothly with the valve.

EXAMPLES 30 AND 31

Each of the composite materials obtained in Examples 4 and 17 were precisely manufactured into a magnetic head base. As a result of a practical test, the head exhibited satisfactory durability without damaging a magnetic recording medium.

EXAMPLES 32 AND 33

Each of the composite materials obtained in Examples 7 and 18 were manufactured into a twisting ring. As a result

EXAMPLES 34 AND 35

Each of the composite materials obtained in Examples 10 and 19 were manufactured into a disc valve for a mixed cock. As a result of a practical test, the disc valve showed lower-torque sliding properties and higher durability as compared with a conventional ceramic disc valve.

While the invention has been described in detail and with reference to specific examples thereof, it will be apparent to one skilled in the art that various changes and modifications can be made therein without departing from the spirit and scope thereof.

What is claimed is:

1. A process for producing a carbon-filled ceramic composite material comprising a ceramic matrix and a carbon domain dispersed therein with a carbon domain diameter of from 0.01 to 30 μm and a final carbon content in the ceramic composite material of from 11 to 36% by weight, comprising mixing a ceramic powder and a carbon source wherein said carbon source has a hydrogen to carbon ratio of from 0.2 to 2.0, a nitrogen content ≦2%, a sulfur content ≦2%, an average molecular weight of from 100 to 2,000, and is selected from the group consisting of a condensed polycyclic aromatic compound, polycondensed aromatic compound, and a mixture thereof; calcining the mixture at a temperature of from 300° to 600° C. in an inert atmosphere; granulating the calcined mixture; shaping the granules; and sintering the shaped article at a temperature of from 1,200° to 2,300° C.

2. A process as claimed in claim 1, wherein said ceramic powder is selected from the group consisting of oxides, carbides, nitrides, borides, and mixtures of two or more thereof.

3. A process as claimed in claim 1, wherein said ceramic powder is silicon carbide.

* * * * *